United States Patent [19]

Klein

[11] 4,055,138
[45] Oct. 25, 1977

[54] UNDERWATER VEHICLE TOWING AND RECOVERY APPARATUS

[75] Inventor: Martin Klein, Amesbury, Mass.

[73] Assignee: Klein Associates, Inc., Salem, N.H.

[21] Appl. No.: 698,300

[22] Filed: June 21, 1976

Related U.S. Application Data

[63] Continuation of Ser. No. 547,998, Feb. 7, 1975, abandoned, which is a continuation of Ser. No. 335,681, Feb. 26, 1973, abandoned.

[51] Int. Cl.² .............................................. B63G 8/42
[52] U.S. Cl. .................................. 114/244; 9/8.3 E; 9/9; 114/253
[58] Field of Search ................. 114/235 B, 244, 253, 114/254, 245; 9/8 R, 8.3 E, 9; 73/170 A

[56] References Cited

U.S. PATENT DOCUMENTS

| 2,035,185 | 3/1936 | Nichols | 9/8.3 E |
|---|---|---|---|
| 2,403,036 | 7/1946 | Wilcoxon et al | 114/235B |
| 2,524,863 | 10/1950 | White | 114/235 B |
| 2,558,870 | 7/1951 | Michelman | 9/8.3 E |
| 3,282,568 | 11/1966 | Shuster | 114/235 B |
| 3,398,715 | 8/1968 | Burg | 114/235 B |
| 3,566,426 | 3/1971 | Davidson et al. | 9/9 |
| 3,605,149 | 9/1971 | Keats | 9/8.3 E |
| 3,703,876 | 11/1972 | Michelsen | 114/235 B |
| 3,921,562 | 11/1975 | Kelly | 114/235 B |

OTHER PUBLICATIONS

8th *Annual Conference and Exposition on Application of Marine Technology to Human Needs*, "A New Depressor and Recovery Method for Undersea Towed Vehicles", 1972, pp. 615–620, Klein et al.

Primary Examiner—Trygve M. Blix
Assistant Examiner—Edward R. Kazenske
Attorney, Agent, or Firm—Rines and Rines, Shapiro and Shapiro

[57] ABSTRACT

This disclosure deals with novel underwater vehicle towing and recovery apparatus, as for recovering sonar or other underwater apparatus in the event of cable severance and for preventing the sinking of apparatus on the stoppage of towing, through the combination of water-foil depressor mechanisms and buoyant recovery chambers provided with signalling apparatus.

8 Claims, 4 Drawing Figures

UNDERWATER VEHICLE TOWING AND RECOVERY APPARATUS

This is a continuation application of Ser. No. 547,998, filed Feb. 7, 1975, now abandoned, which is in turn a continuation of Ser. No. 335,681, filed Feb. 26, 1973, now abandoned.

SUMMARY OF THE INVENTION

The present invention relates to underwater vehicle towing and recovery apparatus, being more particularly directed to equipment for automatically surfacing the vehicles being towed underwater, such as, for example, sonar equipment or the like, in the event of cessation of towing that would normally permit the vehicle to sink and perhaps damage itself on the bottom or on other obstacles, or upon severance of the tow calbe.

A wide variety of underwater tow and recovery vehicles has been proposed and used through the years, including in the field of electronic instrumentation, numerous types of sensors and measuring equipment, such as sonar transducers, hydrophones and other seismic listening apparatus, photographic apparatus and the like. In order to avoid collision with or dropping of the apparatus on the bottom or against obstacles as a result of slow-down or stoppage in towing, feelers and bottom-monitoring systems have been proposed, as described, for example, in U.S. Pat. Nos. 2,996,967 and 3,119,092.

In addition, it has been proposed to provide fins and related structures for stabilizing underwater vehicles, such as sonar transducer arrays and the like, to accomodate for changes in towing speed as described, for example, in my articles entitled "Sonar-A Modern Technique For Ocean Exploitation", *IEEE Spectrum*, June, 1968, pp. 40–47; and "Side-Scan Sonar", *Undersea Technology*, April, 1967, pp. 24–26, 38. Numerous different types of buoy-release systems have also been proposed for enabling surfacing in the event of underwater difficulty as in the current systems of, for example, Ocean Recovery Systems, Inc., Morristown, New Jersey, and Proteus, Inc. Mountain Lakes, New Jersey. None of these proposals, unfortunately, has provided a dynamic, unitary system adaptable to all types of underwater vehicles-to-be-towed, and that will accommodate for multiple difficulties that may be encountered including snagging underwater, changing of towing speed even to stoppage, severance of towing cable; and, once the apparatus in difficulty has been surfaced by appropriate buoying mechanisms, automatically signalling above the surface to enable rapid recovery — and to accomplish the same with a normally passive system that does not require continual measurements or monitoring, that comprises streamlined flow with resistance to drag through the water, and that insures the proper orientation of the apparatus in buoyant recovery.

It is to the attainment of the above objects, without the limitations and difficulties of the prior techniques above-discussed, that the present invention is primarily directed; it being an object of the invention to provide a new and improved underwater vehicle-towing and recovery apparatus particularly adapted to enable automatic and reliable recovery without interfering with stream-lined underwater towing and with assurance of recovery and appropriate signalling upon the stoppage of towing, including the severance of the tow cable.

A further object is to provide a novel underwater vehicle towing apparatus of more general utility, as well.

Still another object is to provide a novel underwater recovery apparatus of broad application.

Still aother object is to provide a novel recovery and signalling buoyant system.

Other and further objects will be explained hereinafter and are more particularly pointed out in the appended claims.

In summary, however, from one of its broad aspects, the invention contemplates underwater vehicle towing and recovery apparatus, having, in combination, tow cable means; vehicle means provided with coupling means for connection to the tow cable means; water foil depressor means connected with the vehicle means for creating downward forces as the vehicle means is towed underwater by the tow cable means; buoyant recovery means connected at one end to be towed parallely with the vehicle means and provided at its other and free end with normally ineffective signalling means, the recovery means being buoyantly adjusted so as to rise free-end upward when the vehicle means is no longer being towed, as upon at least one of stoppage of towing and severance of the tow cable means; and the recovery means being further provided with means for rendering the normally ineffective signalling means effective when the said free-end surfaces in upward position. Preferred details are hereinafter set forth.

BRIEF DESCRIPTION OF DRAWINGS

The invention will now be described with reference to the accompanying drawing, FIG. 1 of which is a schematic isometric drawing illustrating the invention in one of its preferred forms.

DESCRIPTION OF THE INVENTION

Figure 1:
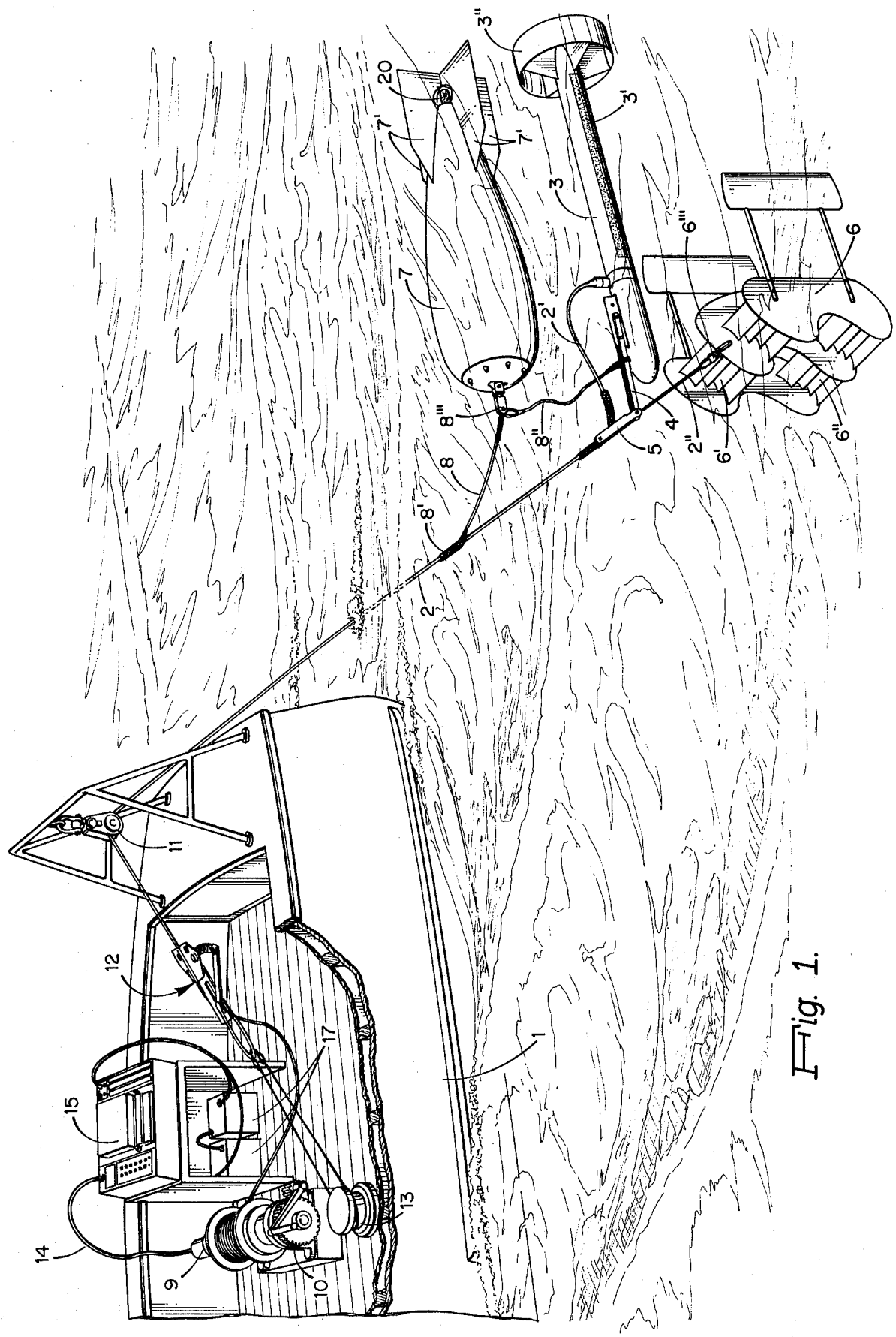

Referring to FIG. 1, a vessel is shown at 1, towing by means of a tow cable assembly 2, an underwater vehicle 3 illustrated in the form of an elongated housing containing arrays of sonar transducers for propagating and receiving sound through longitudinal windows 3', as described, for example, in the before-mentioned references. Clearly, other types of underwater equipment for vehicles may similarly be towed. The tow coupling is illustrated as a pivotal link 4 connected near the forward end of the vehicle 3 to a shackle 5 in the tow cable assembly 2, with the electrical connections carried within the cable 2 and by a waterproof connector cable 2' to the electric terminals within the vehicle 3, as described in the said articles.

In this embodiment, a depressor generally indicated at 6, having curved open fin foil surfaces 6' and 6" presenting greater under-surface area than upper-surface area to produce a resultant downward or depressing force, is shown suspended on the cable 2 below the point of tow connection of the vehicle 3, by the cable extension 2", connecting with a swivel 6'''. The swivel 6''' is used to prevent cable twist when the depressor forces become large. Most cables are not torque-balanced so that they do have a tendency to unwind under load. This extension 2" is preferably made more readily severable or detachable than the remainder of the cable so that, in the event that the depressor, which acts to pull the vehicle 3 downward as the towing starts, may become caught on the bottom or some object, the depressor 6 will detach and permit surfacing of the vehicle 3.

In accordance with the present invention, a buoyant recovery apparatus is provided as shown at 7, preferably in streamlined form with decreasing cross-dimension toward the free or rearward end, which is shown carrying horizontal and verticle stabilizing fins 7'. The forward end of the buoyant recovery member 7 is shown connected by a swivel 8''' and at 8, as by a Chinese-type wire mesh sleeve 8' (such as that of Kellems Company, Stonington, Connecticut), to the tow cable 2; and it is further connected to the vehicle link 4 by a safety cable 8''. The swivel 8''' attached to the nose tow point of the recovery device 7 prevents cable twist in case the recovery device should have a slight tendency to rotate. The buoyancy of the material within the member 7, such as syntactic foam or the like, is positioned and adjusted (in the embodiments of FIGS. 2 and 3A) to cause the device 7, which in towing is towed substantially parallel to vehicle 3, to rise when the towing ceases; either because of stoppage of towing or severance of the tow cable 2 and with the foil end upward, as more particularly illustrated in FIG. 3B.

In the embodiment of FIG. 1, the signals for causing the sonar transducers to transmit and the return signals are fed along conductors within the tow cable assembly 2 through a commutator slip ring 9 in a winch 10, which may be used to pay out and wind up the tow cable 2 under a snatch block 11, controlled by a strain member 12 carried about a capstan 13. The electrical signals pass through the commutator 9 along an interconnecting cable 14 to the recorder 15, such as described in the said articles, and which may be powered from a battery or an AC generator source at 17.

Thus, once the boat 1 starts to move, the depressor 6 insures the rapid submergence of the vehicle 3 and the recovery device 7, and, depending upon the speed, prevents the surfacing of the same. Upon slowing down or cable severance, the recovery device 7 automatically, through its buoyancy adjustment, swings from a horizontal position to a vertically end-upward position and carries the vehicle 3 to the surface.

Figure 3B:
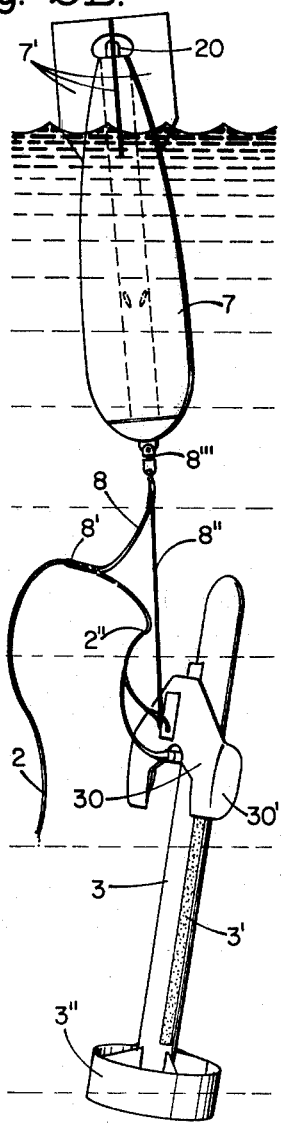
FIGS. 3A and 3B are similar views of preferred modifications in the tow and recovery modes, respectively.

As more particularly shown in FIG. 3B, the buoyant material and the fin structure are adjusted such that the latter is exposed above the surface of the water in the buoyed mode. Further in accordance with the invention, a flashing lamp 20 in the fin structure, or any other electro-magnetic energy signalling element, such as an antenna or appropriately dimensioned conductive fins 7'' serving as radar-reflecting or other propagating surfaces, may indicate the location for recovery purposes.

Figure 2:
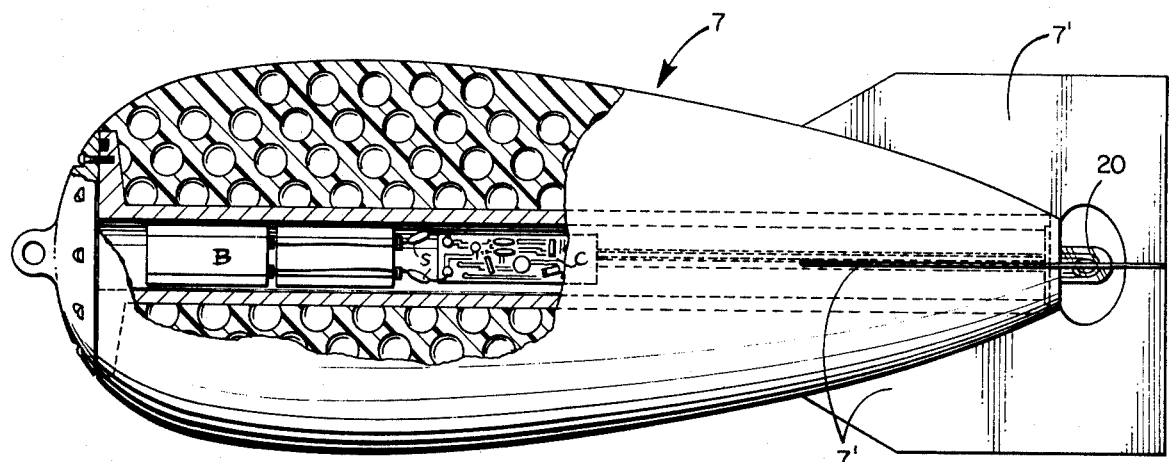
FIG. 2 is an enlarged view partly broken away of the buoyant recovery mechanism of FIG. 1.
Figure 3A:
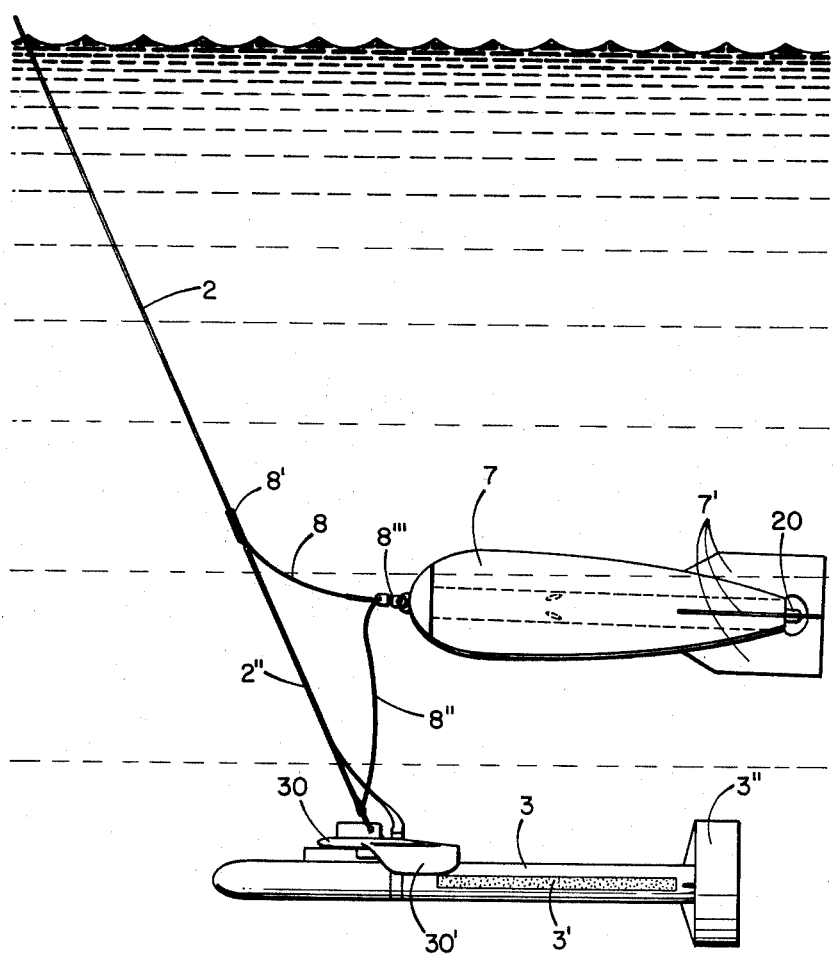

In FIG. 2, the preferred use of flash lamps 20 is illustrated, the flash circuit being normally ineffective when the mercury pool switches S are open-circuit in the horizontal or near-horizontal tow position, but completing the circuit connections and being rendered effective when the recovery mechanism 7 becomes buoyed in an end-up vertical position such tht periodic flashing of the flash lamp will occur. It will be noted that the air-filled housing for the electronic flash circuit, comprising the storage batteries B and charging and discharging circuit C under the control of a multivibrator or other oscillator, also provides an air chamber for supplemental buoyance, through the principal buoyancy adjustment for this embodiment is effected through the preferred plastic foam combined with small plastic spheres.

In the modification of FIG. 3, the depressor 6 has been integrated with the tow vehicle 3, this time in the form of a wing foil structure 30 which may contain buoyant material and which extends transversely of the elongated vehicle housing 3 intermediate the same, though near the nose and above the vehicle 3 such as to produce a combined lower center of gravity. The lower surface of the wing 30 will be convexed to provide greater area than the upper surface and the wing is shown bent angularly rearwardly at the side, then provided with substantially vertical terminal sections 30' for additional stabilization in conjunction with the rear stabilizing fins 3''. In FIG. 3B, the buoyed mode is illustrated upon the severance of towing, with the vehicle 3 recovered.

The recovery buoy structure 7 may in some versions be incorporated in the combined tow vehicle and depressor structure as by rendering the fin section 3'' buoyant and equipping it with the signal lamp 20 and associated circuits. The attachment of the structure 3'' to the vehicle 3 may be effected with shearable nylon bolts, breakaway fins, or other more readily detachable connections such that there may be release upon catching; and, through the safety cables thereto and to the vehicle 3, there may be buoyed recovery of the vehicle similar to that previously described.

The recovery device 7 may also be very effective if used with a coring tool. The core may be placed so that it projects from the noseof the recovery device. The corer is heavily weighted so that it goes rapidly to the bottom. The streamlined shape of the recovery unit 7 enhances stable fall and rapid fall. In other devices, floats such as spheres, before-mentioned, are used which have high hydrodynamic drag. After the core is taken, the core releases and the float brings the core to the surface and floats with signaling means as previously described.

In situations where the tow line is very long or heavy, moreover, it may be useful to add an explosive bolt, timed corrosion link or other disconnect device to detach the towed apparatus frm the tow cable so that the recovery device 7 need only have enough buoyancy to lift the towed vehicle 3.

Further modifications will occur to those skilled in this art and all such are considered to fall within the spirit and scope of the invention as defined in the appended claims.

What is claimed is:

1. Underwater vehicle towing and recovery apparatus having, in combination, tow cable means, vehicle means having coupling means connected to the tow cable means; water foil depressor means connected with the vehicle means for creating downward forces as the vehicle means is towed underwater by the tow cable means; elongated streamlined buoyant recovery means, stabilized at a free end by a fin structure, and disposed above said vehicle means, said recovery means being flexibly connected at a leading end only thereof to a leading end of said vehicle means and to said cable means to be towed horizontally submerged substantially parallel to and above the vehicle means and being provided near its other and free end with the normally ineffective signalling means, the recovery means being permanently buoyantly adjusted so as to rise free-end upward to the surface when the vehicle means is no longer being towed, as upon at least one of stoppage of towing and severance of the tow cable means, to carry at least the vehicle means to the vicinity of the surface, and to float in a vertical attitude with its free end exposed above the surface, said recovery means and said vehicle means being free to move downwardly in response to the downward forces of said depressor means and being devoid of restraint from the water surface other than by said tow cable means; and the recovery means being further provided with means for rendering the normally ineffective signalling means effective when the said free end surfaces in upward position.

2. Underwater vehicle towing and recovery apparatus as claimed in claim 1 and in which the depressor means is disposed below the vehicle means.

3. Underwater vehicle towing and recovery apparatus as claimed in claim 1 and in which the vehicle means comprises a rearwardly stabilized elongated housing for containing apparatus such as sonar transducer means.

4. Underwater vehicle towing and recovery apparatus as claimed in claim 1 and in which said fin structure is of conductive material of dimensons sufficient to serve as radio-signal propagating surfaces upon exposure through the water surface in said upward position.

5. Underwater vehicle towing and recovery apparatus as claimed in claim 1 and in which said signalling means comprises, within said recovery means, electromagnetic-energy signalling apparatus controlled by a position-sensitive switching means adapted to render the signalling apparatus ineffective when the buoyant recovery means is in towed position, but to render the same effective when the signalling apparatus is oriented substantially vertically upon the upward free-end rising of the buoyant recovery means.

6. Underwater vehicle towing and recovery apparatus as claimed in claim 5 and in which said electromagnetic-energy is light energy, said signalling apparatus comprises a periodic flash-discharge circuit with flash lamp means connected therewith and disposed near the said free end to become exposed upon the surfacing thereof.

7. Underwater vehicle towing and recovery apparatus as claimed in claim 1 and in which means is provided for automatically detaching the depressor means from the vehicle means if the former becomes caught underwater during towing.

8. Underwater vehicle towing and recovery apparatus as claimed in claim 1 and in which said recovery means is flexibly connected to said vehicle means and to said cable means by corresponding cables.

* * * * *